(12) United States Patent
Saito

(10) Patent No.: US 6,349,303 B1
(45) Date of Patent: Feb. 19, 2002

(54) INFORMATION PROCESSING APPARATUS AND METHOD

(75) Inventor: Kazuyuki Saito, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/204,271

(22) Filed: Dec. 3, 1998

(30) Foreign Application Priority Data

Dec. 10, 1997 (JP) .............................................. 9-340261

(51) Int. Cl.$^7$ .............................................. G06F 17/00
(52) U.S. Cl. .................... 707/101; 379/202.01; 709/204
(58) Field of Search ................. 707/101, 102; 379/88.19, 133, 202.01, 88.09, 88.11, 93.21, 100.13, 88.01; 348/14.08–14.1; 370/260; 709/204

(56) References Cited

U.S. PATENT DOCUMENTS

| | | | | |
|---|---|---|---|---|
| 5,187,735 A | * | 2/1993 | Garcia et al. .................. | 379/88 |
| 5,483,588 A | * | 1/1996 | Eaton et al. ................. | 379/202 |
| 5,526,407 A | * | 6/1996 | Russell et al. ............ | 379/88.01 |
| 5,790,180 A | * | 8/1998 | Wild ............................ | 348/16 |
| 5,970,418 A | * | 10/1999 | Budd et al. .................. | 455/550 |
| 6,070,167 A | * | 5/2000 | Qian et al. ................... | 707/102 |
| 6,100,882 A | * | 8/2000 | Sharman et al. ............ | 345/320 |

OTHER PUBLICATIONS

Nakamura et al "Personal multimedia teleconferencing terminal", IEEE 1990, pp. 0123–0127.*

* cited by examiner

*Primary Examiner*—Thomas Black
*Assistant Examiner*—Uyen Le
(74) *Attorney, Agent, or Firm*—Fitzpatrick, Cella, Harper & Scinto

(57) ABSTRACT

In a teleconference, text data and still-picture data are generated from sound data and moving-picture data that originated in a conference room A, and text data and still-picture data are generated from sound data and moving-picture data that originated in a conference room B. These items of data are arranged in a time series to create the minutes of a conference that are in line with the flow of the conference. Accordingly, when the minutes of a teleconference are created automatically, it is possible to create minutes that clearly indicate in which conference room statements were made and images were generated as well as the order in which these events occurred.

19 Claims, 15 Drawing Sheets

INFORMATION PROCESSING APPARATUS AND METHOD

BACKGROUND OF THE INVENTION

1. Field of the Invention

This invention relates to an information processing apparatus and method, particularly an information processing apparatus and method for creating, e.g., the minutes of a conference based upon entered information.

2. Description of the Related Art

So-called teleconferencing in which a conference is held by interconnecting a plurality of remotely located conference rooms utilizing a network has become commonplace in recent years. With telephone conferencing, the form and utterances of a conference participant located in a remote conference room are transmitted by a video camera or the like installed in the conference room. If sound recognition and image recognition are applied, the minutes in which the content of the meeting is recorded can be created based upon the images and sounds recorded.

Minutes created using sound and image recognition make it possible in some degree to collect, in a form in line with the flow of the conference, what has been said at the conference. However, it is not easy to tell from the minutes what was said in which conference room.

SUMMARY OF THE INVENTION

Accordingly, an object of the present invention is to solve the above-mentioned problem and provide an information processing apparatus and method whereby it is possible to create document data that indicates the locations at which information contained in the document data was generated as well as the order in which the information was generated.

According to the present invention, the foregoing object is attained by providing an information processing apparatus comprising: input means for inputting different pieces of information, each of which is generated in different locations; recognition means for recognizing speech contained in the each piece of input information and generating text from the speech recognized; and generating means for generating data in which text that is generated and images that are contained in each piece of input information have been arranged based upon the locations at which the information originated and the order in which this information originated.

Further, according to the present invention, the foregoing object is attained by providing an information processing method comprising the steps of: inputting different pieces of information, each of which is generated in different locations; recognizing speech contained in the each piece of input information and generating text from the speech recognized; and arranging text that is generated and images that are contained in the each piece of input information based upon the locations at which the information originated and the order in which this information originated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of an information processing apparatus and method according to the present invention will now be described in detail with reference to the accompanying drawings.

First Embodiment

Figure 1:
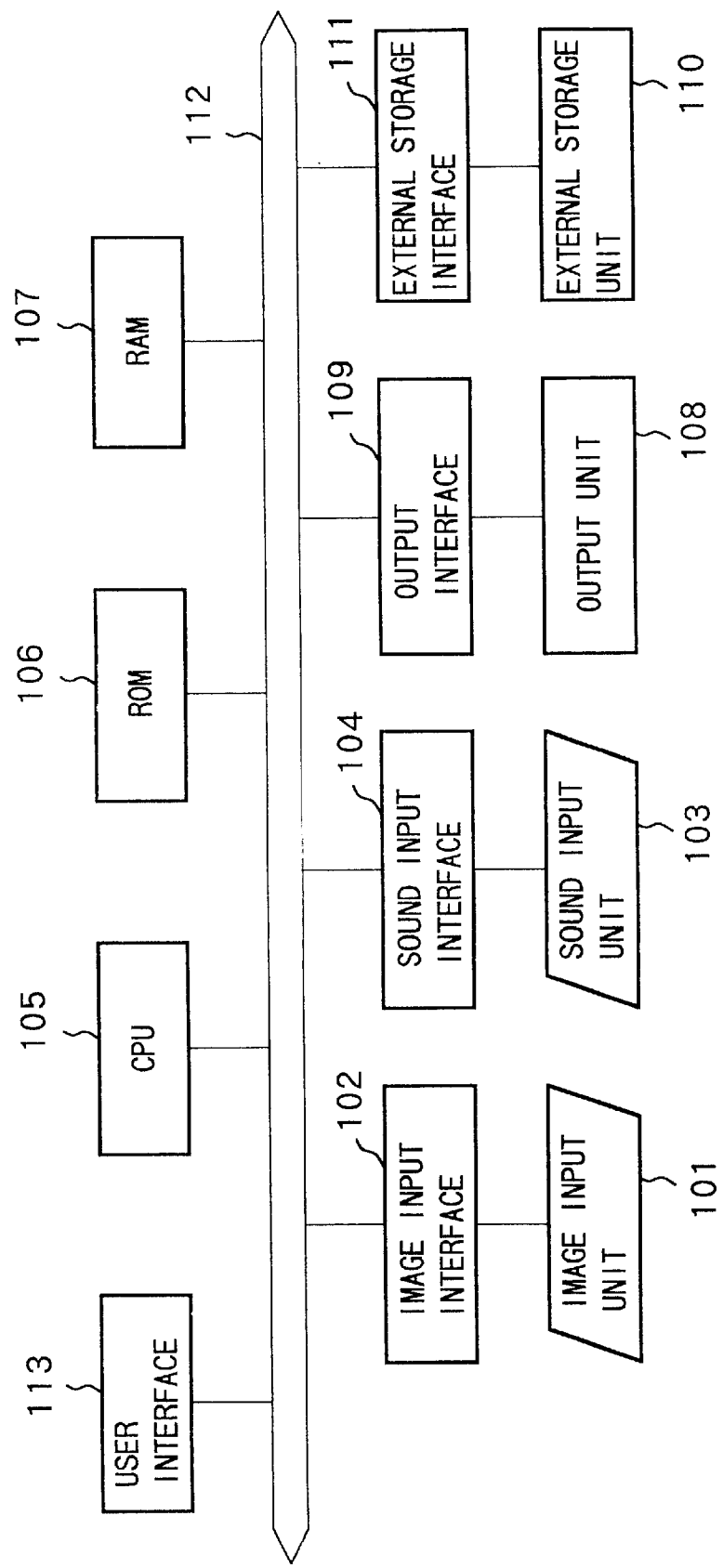
FIG. 1 is a block diagram showing the construction of an information processing apparatus according to a first by embodiment of the present invention.

FIG. 1 is a block diagram showing the construction of an information processing apparatus according to a first embodiment of the present invention.

As shown in FIG. 1, the information processing apparatus includes an image input unit 101, an image input interface 102, a sound input unit 103, a sound input interface 104, a CPU 105, a ROM 106, a RAM 107, an output unit 108, an output interface 109, an external storage unit 110, an external storage interface 111, a user interface 113 and a system bus 112.

The image input unit 101 is for inputting an image from an external device, the image input interface 102 interfaces the image input unit 101 and the system bus 112, the sound input unit 103 is for inputting sound from an external device, the sound input interface 104 interfaces the sound input unit 103 and system bus 112, and the CPU 105 is for controlling the overall apparatus and executing the application program of the present invention.

The ROM 106 stores a program for controlling the overall apparatus, the application program of the present invention, and various data. The RAM 107 is used as an area for saving the entered image data and sound data and as a working area for the CPU105. The output unit 108 is a monitor, such as a CRT or LCD, and a printer for outputting document data and the like processed using the information processing apparatus of the present invention. The output interface 109 interfaces the output unit 108 and system bus 112.

The external storage unit 110 writes and reads various data and programs to and from various storage media such as a floppy disk and a hard disk. The external storage interface 111 interfaces the external storage unit 110 and the system bus 112. The user interface 113 has a keyboard and a pointing device, such as a mouse, and allows the operator of the information processing apparatus to make entries.

The system bus 112 interfaces the image input interface 102, the sound input interface 104, the CPU 105, the ROM 106, the RAM 107, the output interface 109, the user interface 113, and the external storage interface 111.

Figure 2:
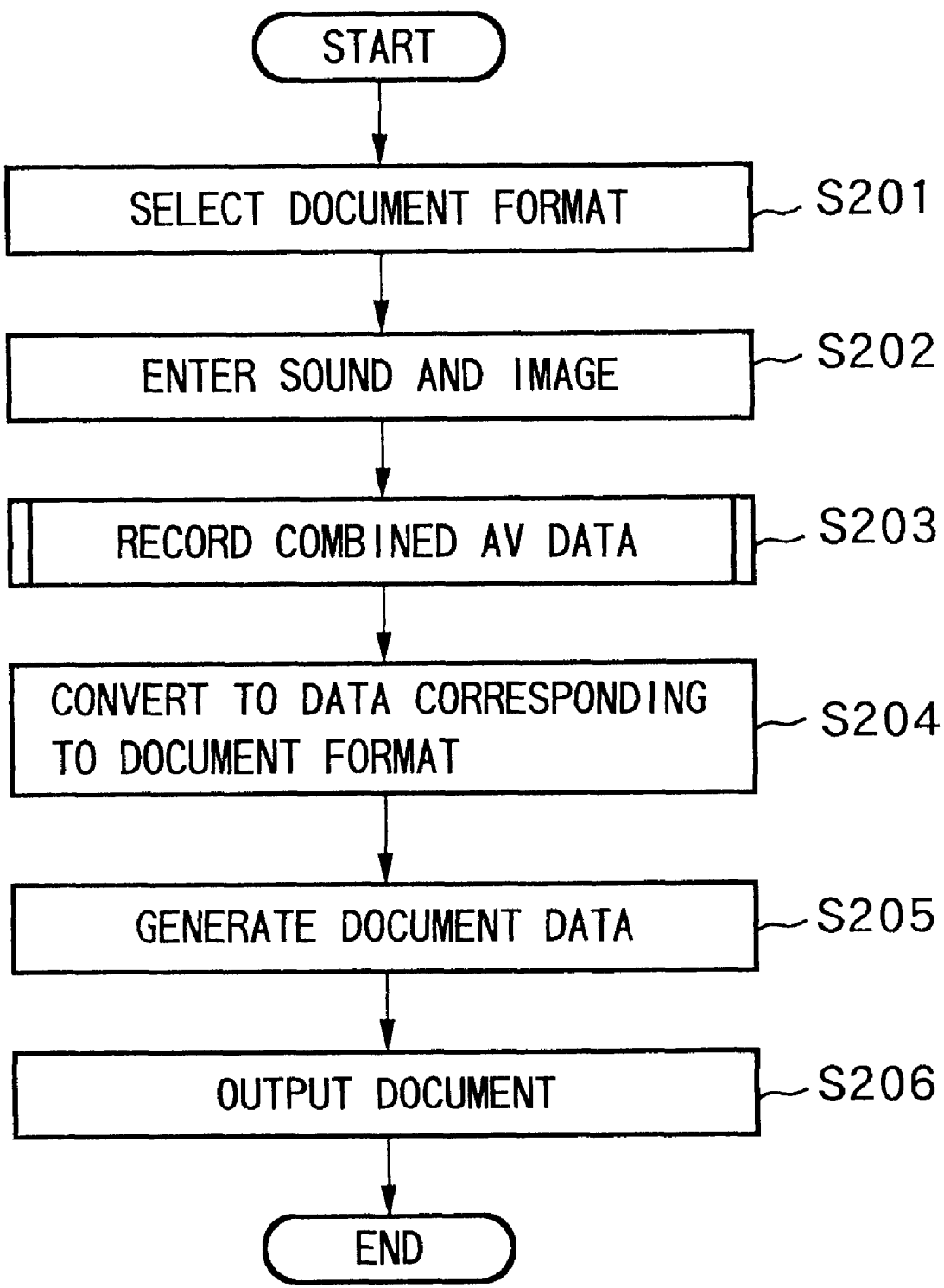
FIG. 2 is a flowchart for describing processing executed by the information processing apparatus of the first embodiment.

FIG. 2 is a flow chart for describing the processing executed by the information processing apparatus of the first embodiment. In the first embodiment, a case will be described in which the present invention is applied to a teleconference carried out between two points.

At step S201 in FIG. 2, the user selects a desired document format (file format) in order to convert entered sound and moving pictures to a document format such as the HTML (Hypertext Markup Language) format, RTF (Rich Text Format) or PDL (Page Description Language) format, etc. It will be assumed in this embodiment that the user has selected RTF as the document format.

Next, at step S202, sound and moving pictures output by an external device connected to a network, for example, are input via the sound input unit 103 and the image input unit 101. Since a teleconference carried out between two points is taken as the example in the first embodiment, sound and moving pictures output by the external device installed at point A and sound and moving pictures output by the external device installed at point B are entered at step S202.

Figure 3:
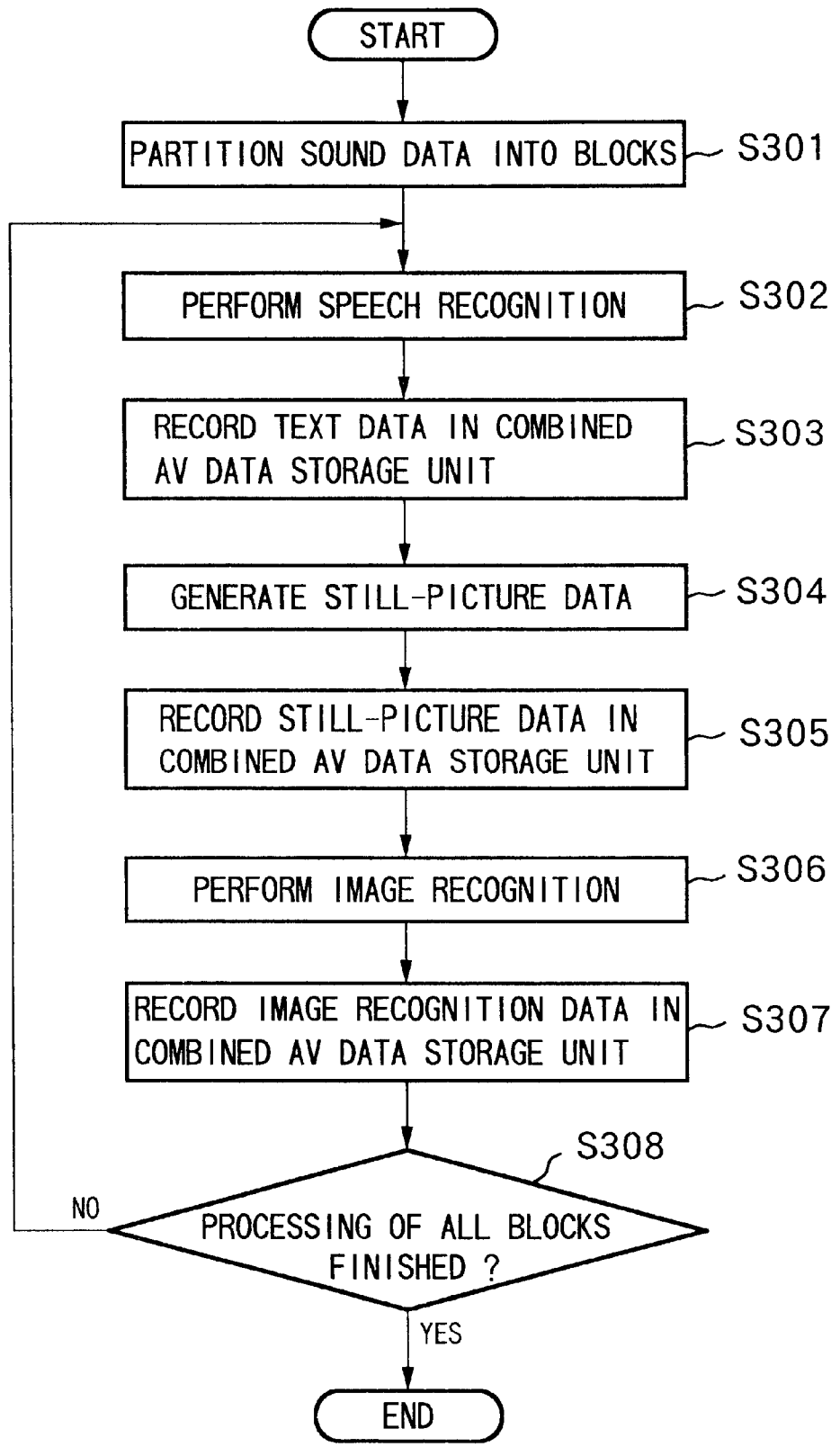
FIG. 3 is a flowchart useful in describing the details of processing of a step S203 in FIG. 2.

This is followed by step S203, at which the sound data is partitioned into sound blocks and soundless blocks based upon the entered sound data and then recorded in a combined AV data storage unit 41, which has been allocated in the RAM 107, as combined audio-video data (referred to as "combined AV data" below). Further, information such as position information and time information indicating the location at which the entered sound and moving-picture data was entered is input from the external device and is recorded in an area provided in the combined AV data storage unit 41 to store this position and time information. The details of the processing of step S203 will be described in accordance with the flowchart of FIG. 3.

Figure 5:
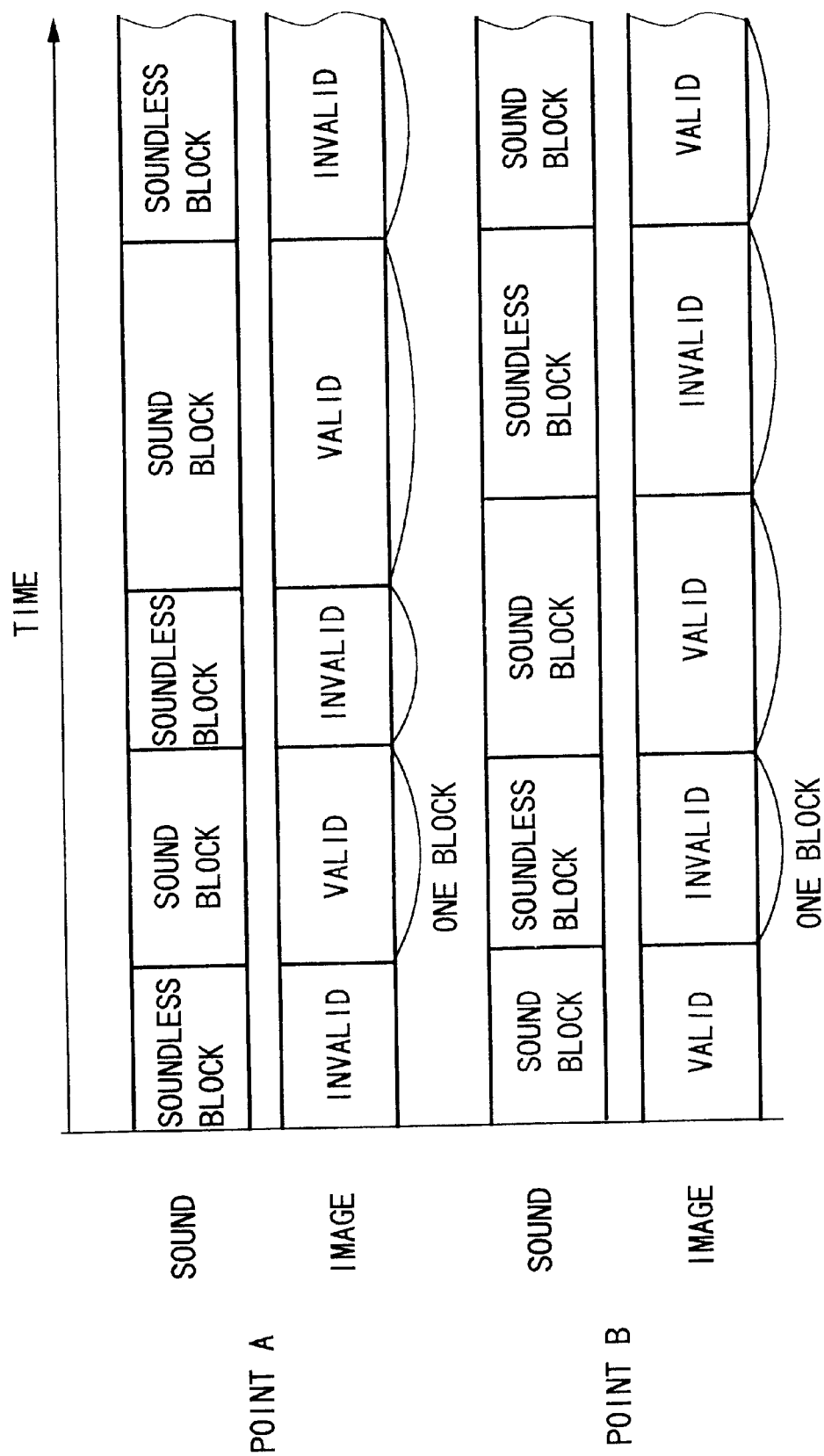
FIG. 5 is a diagram useful in describing the manner in which entered sound and moving pictures are partitioned into blocks according to the first embodiment.

The sound data is partitioned into sound blocks and soundless blocks at step S301 based upon the entered sound data. This partitioning of sound data into blocks will be described with reference to FIG. 5. In a case where the period of time required for the level of reproduced sound data to fall below a prescribed level after it has reached this level is greater than a prescribed time set in advance, the sound data corresponding to this period of time is treated as one sound block. In a case where the period of time required for the level of reproduced sound data to fall below the prescribed level after it has reached this level is a period of time that is less than a prescribed time set in advance, the sound data corresponding to this period of time is treated as one soundless block. In addition, sound data corresponding to the period of time required for the level of reproduced sound data to reach the prescribed level after it has fallen below this level is treated as one soundless block.

Next, at step S302, the sound data of the sound blocks is subjected to speech recognition on a block-by-block basis and speech contained in the sound data is converted to text code. It should be noted that this speech recognition processing is capable of being executed by well-known techniques. Next, at step S303, one block of the text data is recorded in the area of the combined AV data storage unit 41 that is for storing the text data, as shown in FIG. 4.

Next, at step S304, moving-picture data that corresponds to one sound block is partitioned at prescribed time intervals T and n items of still-picture data are generated from the moving-picture data that corresponds to the time partitioned. The n items of still-picture data are treated as valid image data corresponding to one sound block; moving-picture data corresponding to one soundless block is treated as invalid image data. It should be noted that in a case where n-items of still-picture data are generated from moving-picture data, it is also possible for the system or user to select only the initial frame of the moving-picture data of the corresponding interval as the still-picture data. In other words, n=1 would hold in this case. If this arrangement is adopted, the amount of still-picture data stored can be reduced and the storage area of the combined AV data storage unit 41 can be used more effectively.

Figure 4:
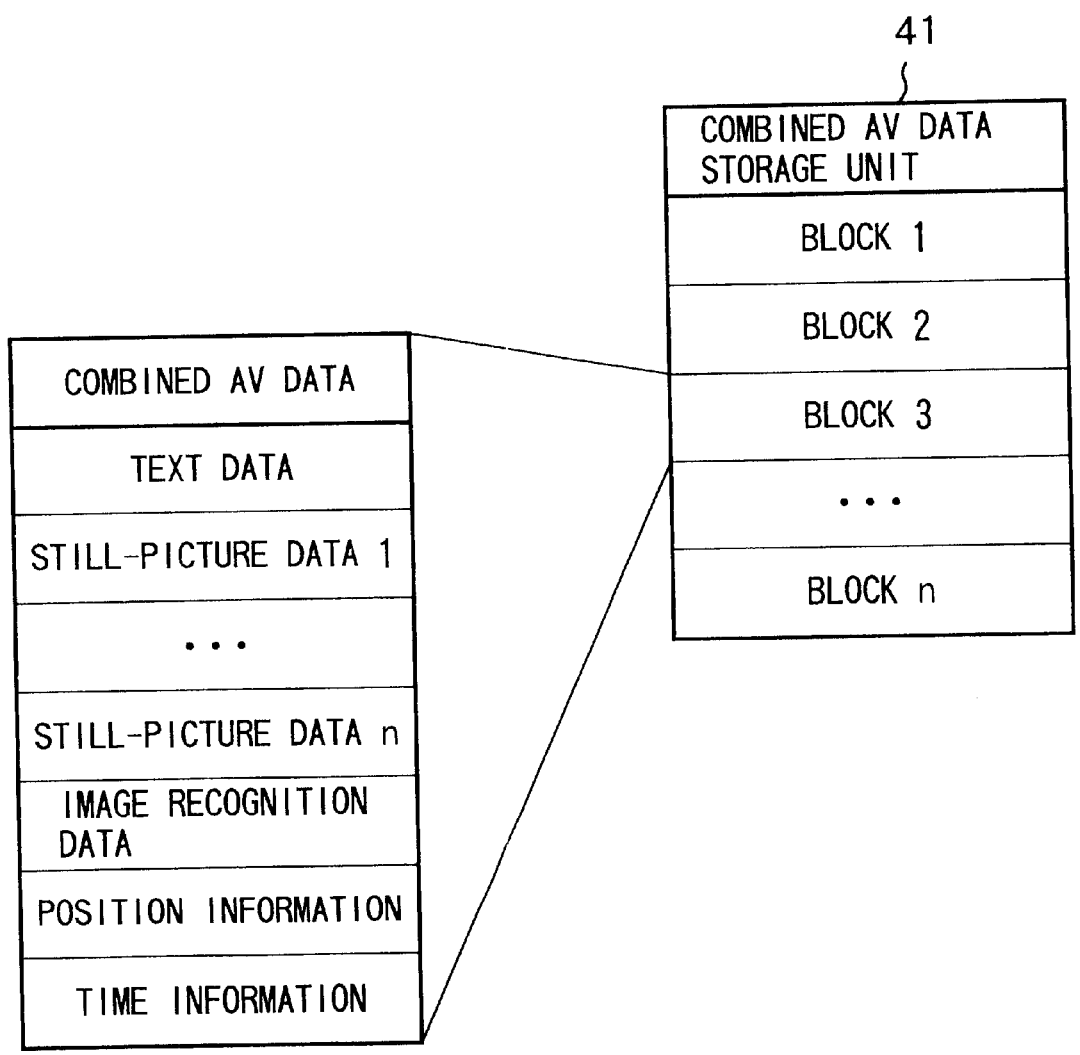
FIG. 4 is a diagram showing the structure of a combined audio-visual data storage unit according to the first embodiment.

Next, at step S305, the valid image data, namely the n items of still-picture data corresponding to one sound block, is stored in the area of the combined AV data storage unit 41 that is for storing this valid image data, as shown in FIG. 4.

This is followed by step S306, at which characters, tables and the like contained in one block of valid image data that has been stored in the combined AV data storage unit 41 are subjected to image recognition and converted to image recognition data. This image recognition processing can be executed by well-known techniques. As shown in FIG. 4, one block of image recognition data thus obtained is stored in the area of the combined AV data storage unit 41 that is for storing image recognition data.

It is determined at step S308 whether all of the blocks obtained by partitioning at step S301 have been subjected to the processing of steps S302–S307. If the processing of all blocks is finished, control proceeds to step S204. If all blocks have not yet been processed, then control returns to step S302.

Thus, the items of text data, valid image data and image recognition data generated based upon the sound data and moving-picture data corresponding to each of the blocks are stored in the respective storage areas of the combined AV data storage unit 41.

At step S204 the text data that has been stored in the combined AV data storage unit 41 is converted to RTF document data block by block, and the n items of still-picture data and image recognition data corresponding to this document data are converted to an image data format suitable for being appended to the RTF document data. It should be noted that the image data appended to the document data can also be selected at will from the n items of still-picture data and image recognition data.

This is followed by step S205, at which the user or system decides the layout for recording the RTF document data and still-picture data (and/or image recognition data) on a recording medium using, e.g., the printer of the output unit 108. A teleconference carried out between two points is taken as the example in the first embodiment. Accordingly, processing is executed to combine the RTF document data and the still-picture data (and/or the image recognition data) based upon the sound data indicating the content of utterances made at point A during the conference and the moving-picture data indicating the appearance of the conference room at point A, with the RTF document data and the still-picture data (and/or the image recognition data) based upon the sound data indicating the content of utterances made at point B during the conference and the moving-picture data indicating the appearance of the conference room at point B, thereby putting the combine data in the form of document data. Though plural items of still-picture data and image recognition data can be made document data in their entirety, it is also possible to select image data freely from the plural items of still-picture data and image recognition data, as mentioned above, and put the selected image data in the form of document data.

The image corresponding to the document data created at step S205 is printed at step S206 by the printer, etc.

Figure 6:
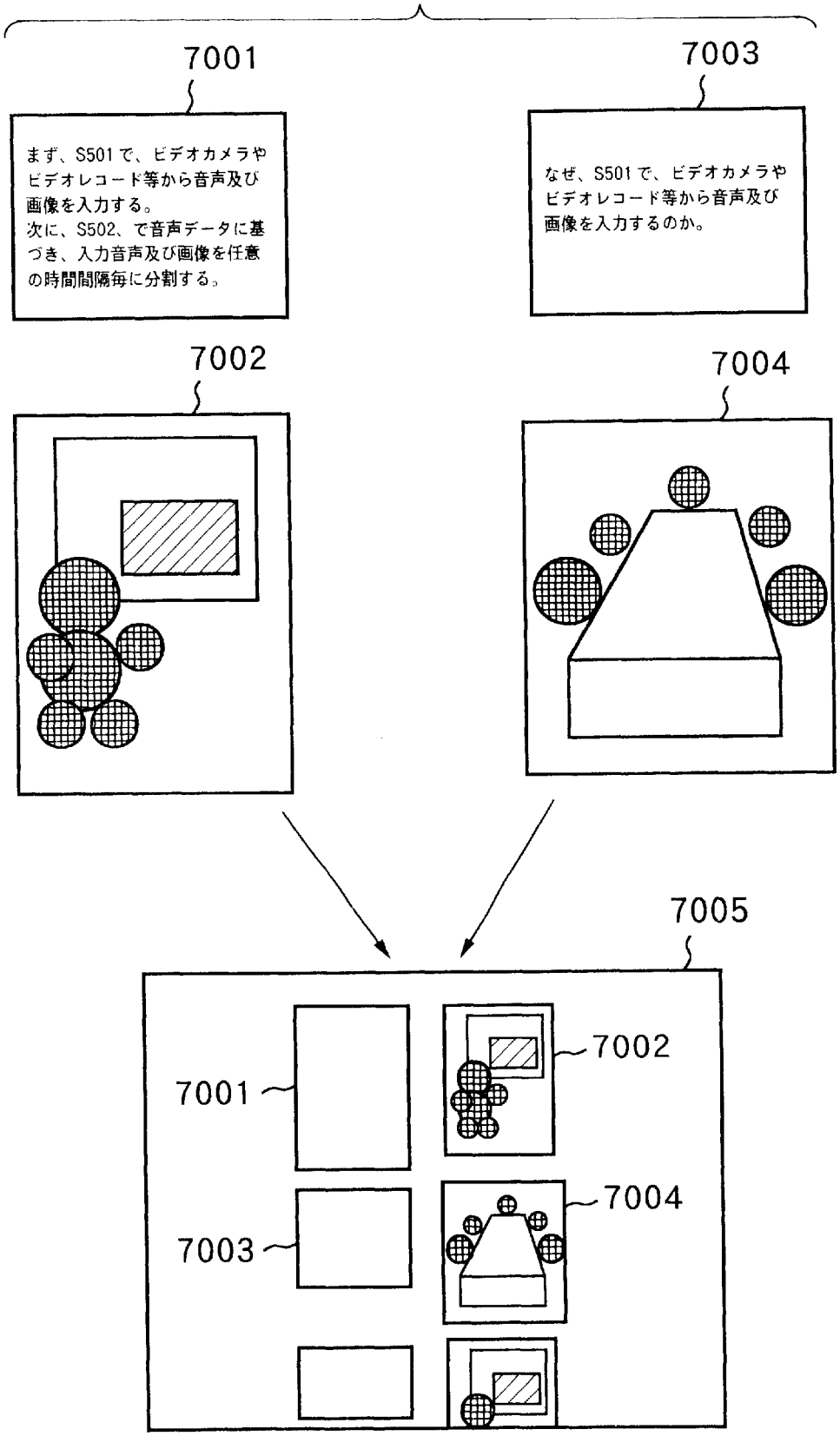
FIGS. 6 and 7 are diagrams useful in describing arrangements of documents according to the first embodiment.

FIG. 6 is a diagram useful in describing the arrangement of a document.

As shown in FIG. 6, text data 7001 has been generated based upon sound data indicating the content of utterances made at point A. Shown at 7002 is still-picture data, or image recognition data, that is generated based upon moving-picture data indicating the appearance of the conference room at point A. This is data of the same block as that of the text data 7001. Text data 7003 has been generated based upon sound data indicating the content of utterances made at point B. Shown at 7004 is still-picture data, or image recognition data, that is generated based upon moving-picture data indicating the appearance of the conference room at point B. This is data of the same block as that of the text data 7003.

As illustrated at 7005, text data and image data at point A and text data and image data at point B are laid out in a time series (serially) to create minutes arranged in line with the flow of the conference.

Figure 7:
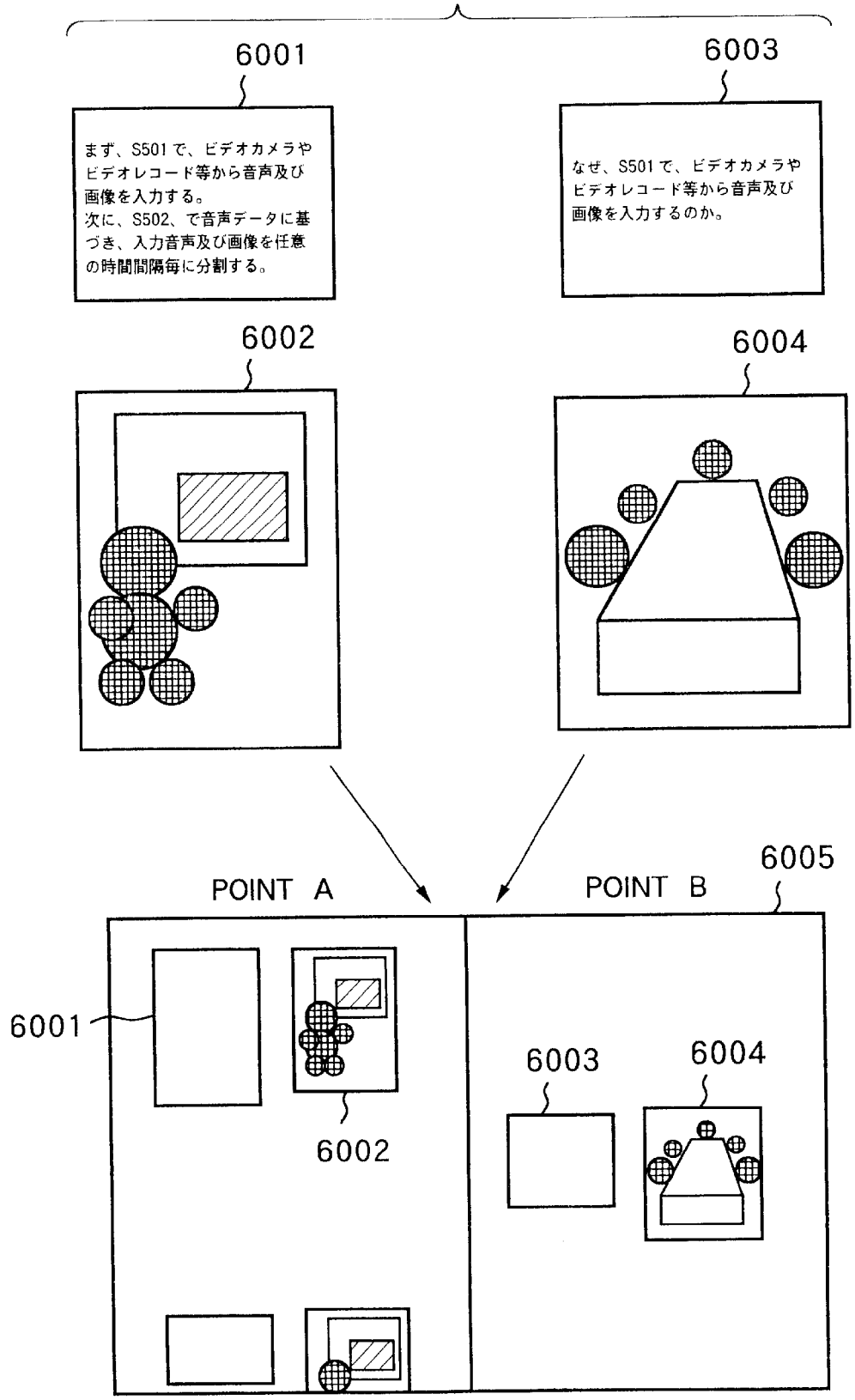

In FIG. 7, 6001 denotes text data that has been generated based upon sound data indicating the content of utterances made at point A, and 6002 denotes still-picture data that has been generated based upon moving-picture data indicating the appearance of the conference room at point A. This is data of the same block as that of the text data 6001. Text data 6003 has been generated based upon sound data indicating the content of utterances made at point B. Shown at 6004 is still-picture data that has been generated based upon moving-picture data indicating the appearance of the conference room at point B. This is data of the same block as that of the text data 6003.

As illustrated at 6005, text data and image data that originated at point A is laid out, say, on the left side of the printing paper or the like, and text data and image data that originated at B is laid out on the right side of the printing paper. If the sets of text data and image data are laid out in the vertical direction in the order in which utterances were made, it is possible to create minutes that are in line with the flow of the conference and that make clear what was said in which conference room.

Second Embodiment

A second embodiment of the present invention creates minutes or the like by applying image recognition to characters and tables, etc., contained in still-picture data that has been stored in the combined AV data storage unit 41, and converting reference materials used during a conference to text data and table data.

Processing executed by the information processing apparatus of the second embodiment will be described in accordance with the flowcharts of FIGS. 2 and 8. In the second embodiment, only the processing of step S203 in FIG. 2 differs from that described earlier. Steps S201, S202, S204–S206 in FIG. 2, therefore, need not be described again detail. Similarly, the processing of steps S802 to S805 in FIG. 8 is the same as that of step S301 to S305 in FIG. 3 and need not be described again.

Figure 8:
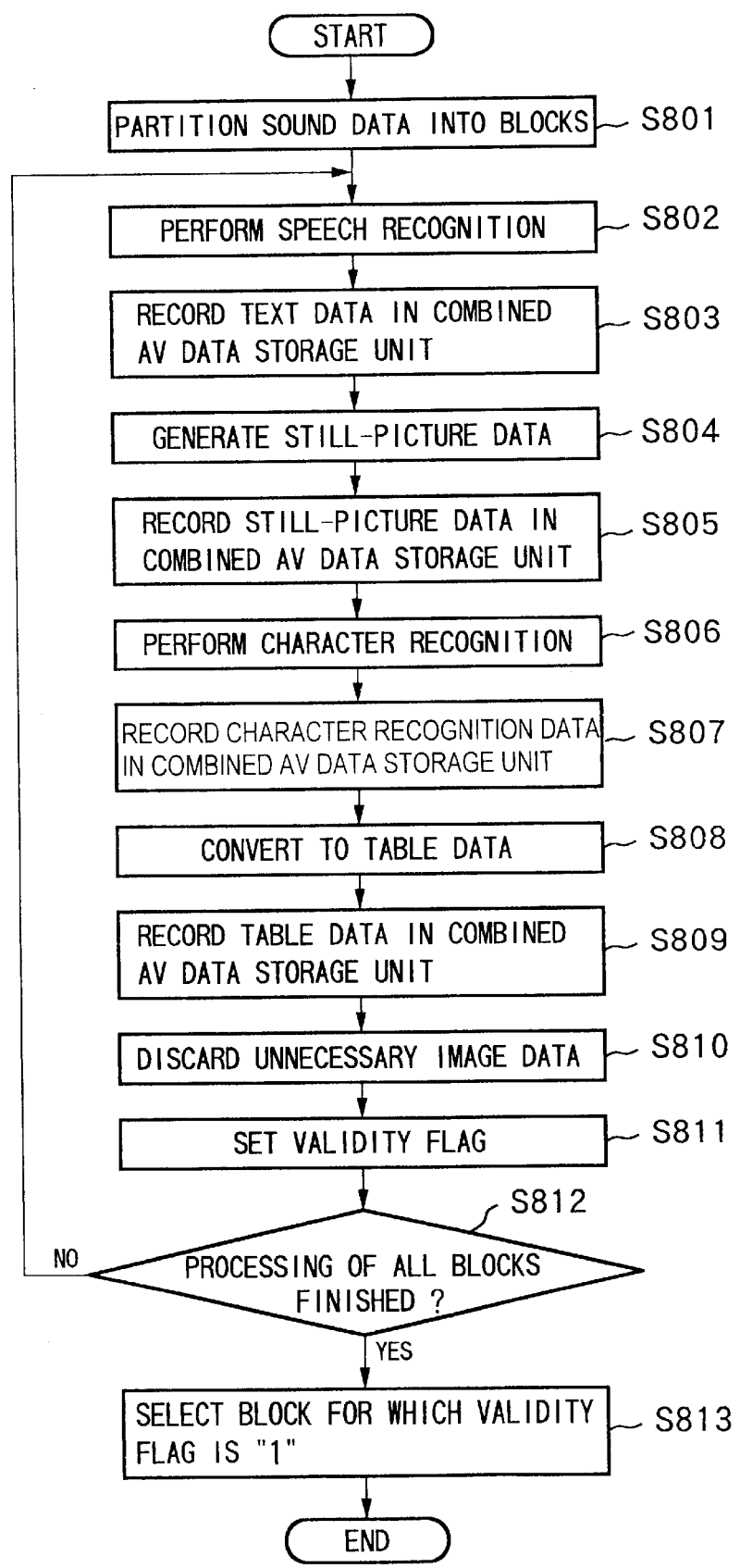
FIG. 8 is a flowchart useful in describing the details of processing of the step S203 in FIG. 2 according to a second embodiment of the present invention.

At step S806 in FIG. 8, image recognition is applied to characters, tables and the like contained in one block of still-picture data that has been stored in the combined AV data storage unit 41. If the still-picture data contains a character area, a character or symbol included in the character area is converted to text code by character recognition processing. This character recognition processing can be carried out by well-known techniques. This is followed by step S807, at which the one block of obtained text data is recorded in an area of the combined AV data storage unit 41 that is for storing character recognition data. This is as illustrated in FIG. 9.

If character recognition has been applied to characters, tables and the like contained in one block of still-picture data stored in the combined AV data storage unit 41 and the still-picture data is found to contain a table area, then characters, symbols and ruled lines contained in the table area are converted at step S808 to a table data format capable of being used by spreadsheet software, for example. This image recognition processing can be carried out by well-known techniques. This is followed by step S809, at which the one block of table data obtained by conversion is recorded in an area of the combined AV data storage unit 41 that is for storing table data, as illustrated in FIG. 9.

If the one block of n items of still-picture data includes image data of substantially identical content, one item of this image data is kept and the others are deemed to be unnecessary and are discarded at step S810. For example, the difference between two items of still-picture data can be taken. If the difference falls within a prescribed range, a judgment can be rendered to the effect that the two items of still-picture data are substantially identical in terms of content.

Figure 9:
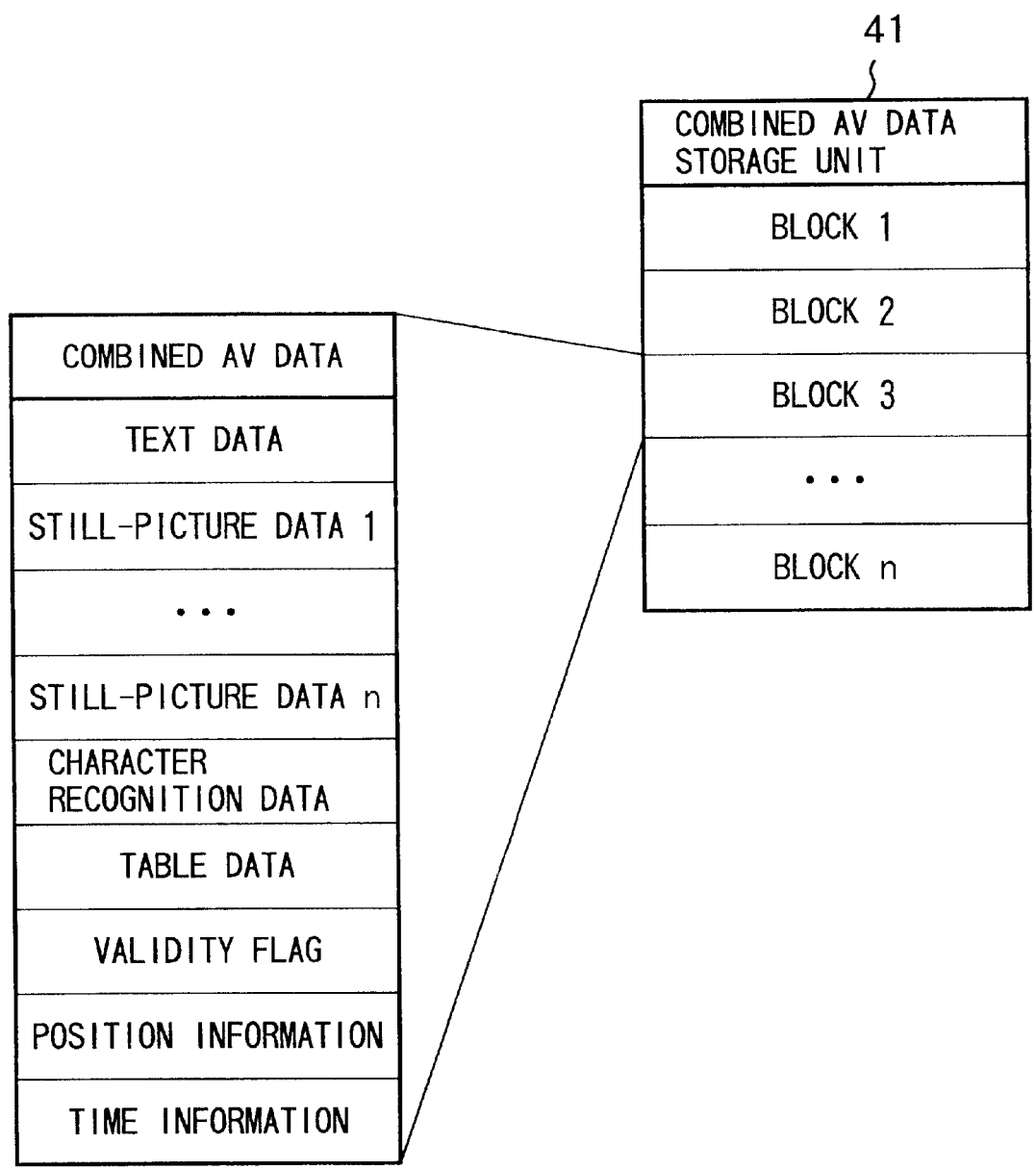
FIG. 9 is a diagram showing the structure of a combined audio-visual data storage unit according to the second embodiment.

If text data has been stored in the combined AV data storage unit 41, then "1", for example, is recorded at step S811 as a validity flag contained in the combined AV data storage unit 41 of FIG. 9. If text data has not been stored in the combined AV data storage unit 41, then "0", for example, is recorded as the validity flag at step S811. Next, at step S812, it is determined whether the processing of steps S802–S811 has been completed for all of the blocks obtained by partitioning at step S801. Control proceeds to step S813 if the answer is "YES" but returns to step S802 if the answer is "NO".

Thus, items of text data, still-picture (valid-image) data, table data and character rececnition data that are generated based upon sound data and moving-picture data corresponding to each block are stored in respective storage areas of the combined AV data storage unit 41.

The validity flags of all blocks contained in the combined AV data storage unit 41 are referred to and a block for whick. Control then proceeds to step S204, where the text data contained in the selected valid block is converted to RTF document data is converted to an image data format suitable for being appended to the RFT document data.

Figure 10:
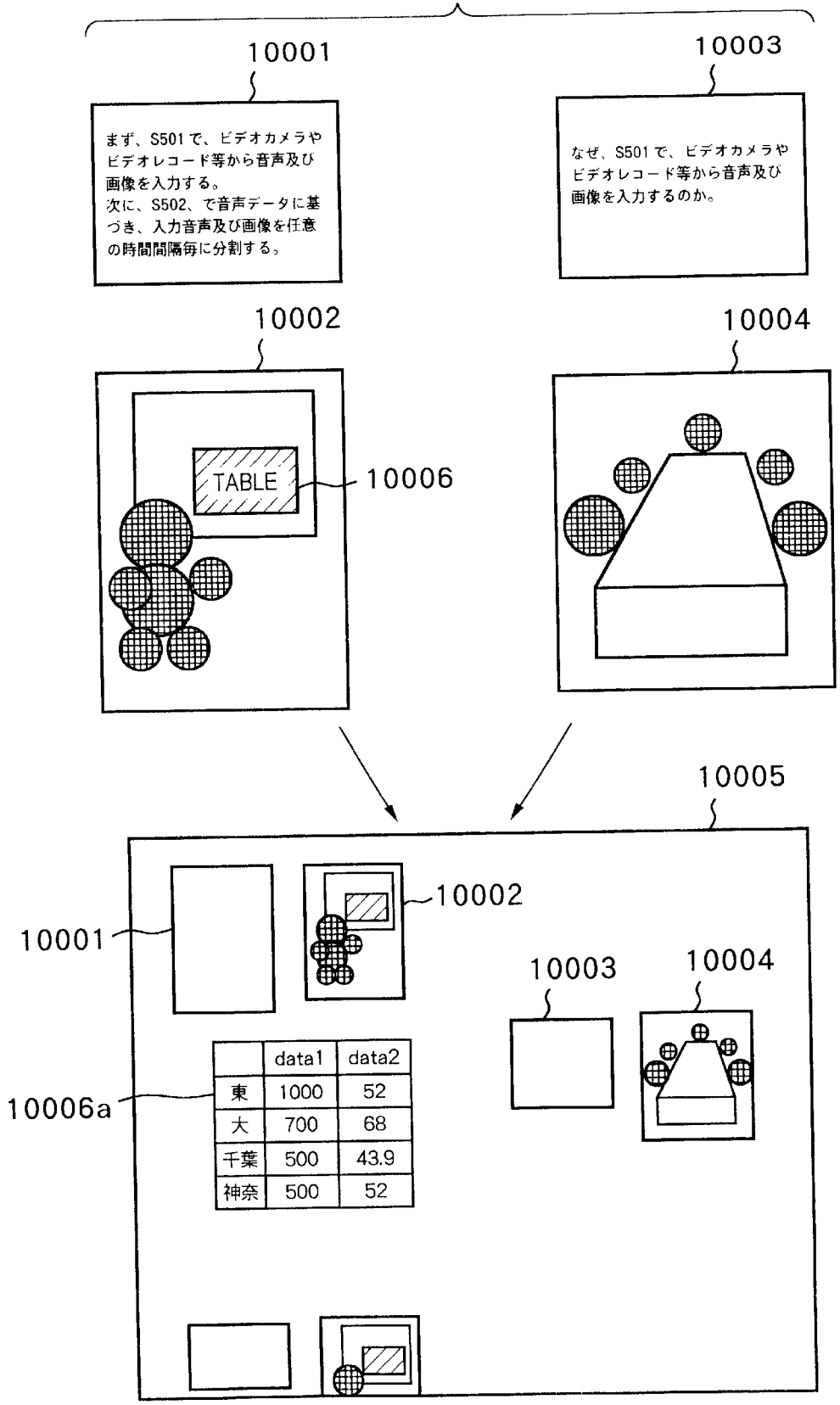
FIG. 10 is a diagram useful in describing the arrangement of a document according to the second embodiment.

FIG. 10 is a diagram useful in describing the arrangement of a document according to this embodiment.

As shown in FIG. 6, text data 10001 has been generated based upon sound data indicating the content of utterances made at point A. Shown at 10002 is still-picture data generated based upon moving-picture data indicating the appearance of the conference room at point A. This is data of the same block as that of the text data 10002. The still-picture data 10002 contains a table 10006.

Text data 10003 has been generated based upon sound data indicating the content of utterances made at point A. Shown at 10004 is still-picture data generated based upon moving-picture data indicating the appearance of the conference room at point B. This is data of the same block as that of the text data 10003.

As illustrated at 10005, text data and image data from point A is laid out, say, on the left side of the printing paper or the like, and text data and image data from point B is laid out on the right side of the printing paper. If table data 10006a obtained by applying image recognition to the table 10006 contained in the still-picture data 10002 is laid out at a desired position on the printing paper, minutes that are in line with the flow of the conference and contain greater detail can be created.

Third Embodiment

A third embodiment of the present invention will be described in regard to a case where moving-picture data is handled by the HTML document format.

Figure 11:
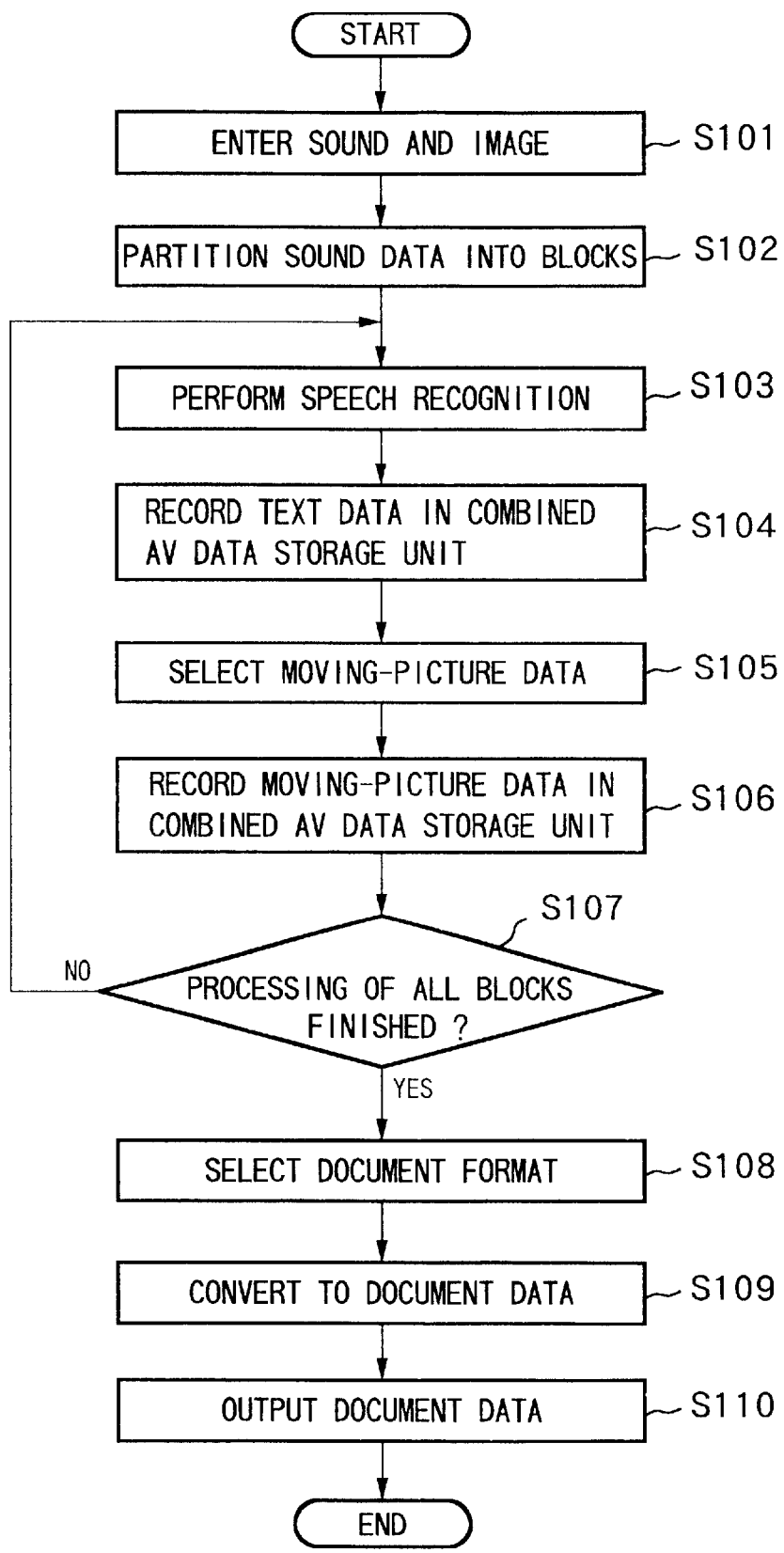
FIG. 11 is a flowchart for describing processing executed by an information processing apparatus according to a third embodiment of the present invention.

FIG. 11 is a flowchart for describing processing executed by an information processing apparatus according to the third embodiment of the present invention.

Sounds and moving pictures output from an external device connected to a network or the like are input via the sound input unit 103 and image input unit 101 at step S101. The sound data is partitioned into sound blocks and soundless blocks at step S102 based upon the entered sound data.

Figure 13:
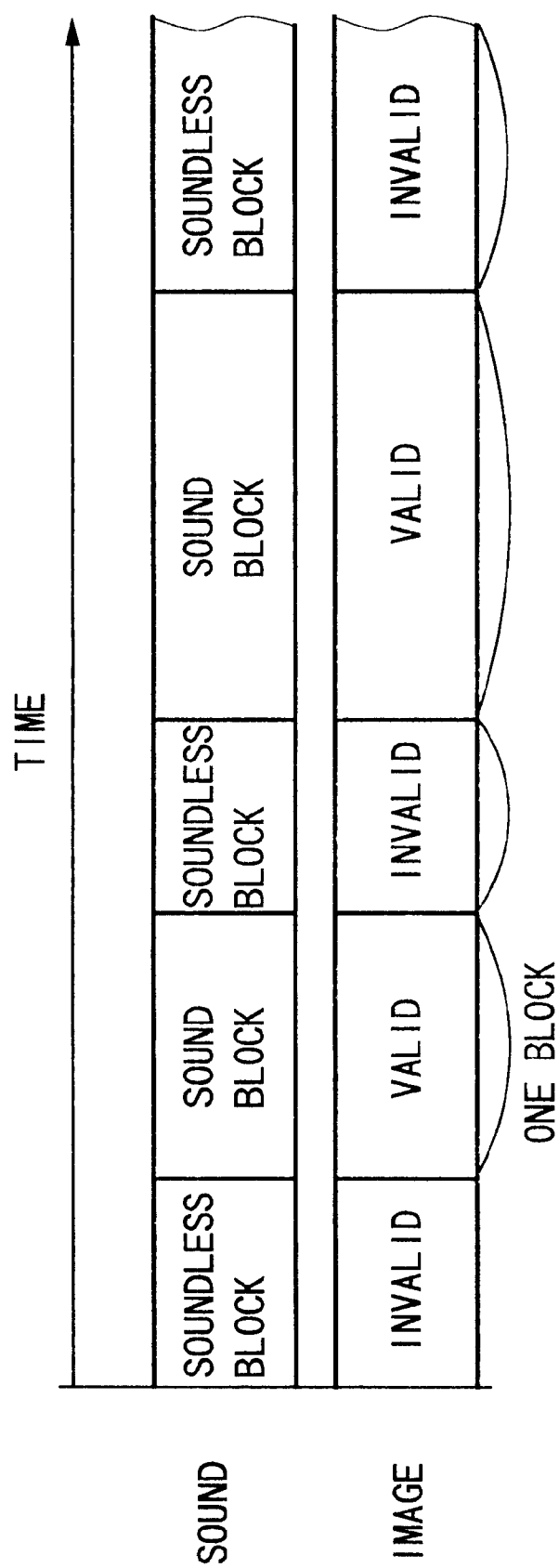
FIG. 13 is a diagram useful in describing the manner in which entered sound and moving pictures are put into block form in the third embodiment.

FIG. 13 is a diagram useful in describing this partitioning of the sound data into blocks. In a case where the period of time required for the level of reproduced sound data to fall below a prescribed level after it has reached this level is greater than a prescribed time set in advance, the sound data corresponding to this period of time is treated as one sound block. In a case where the period of time required for the level of reproduced sound data to fall below the prescribed level after it has reached this level is a period of time that is less than a prescribed time set in advance, the sound data corresponding to this period of time is treated as one soundless block. In addition, sound data corresponding to the period of time required for the level of reproduced sound data to reach the prescribed level after it has fallen below this level is treated as one soundless block.

Figure 12:
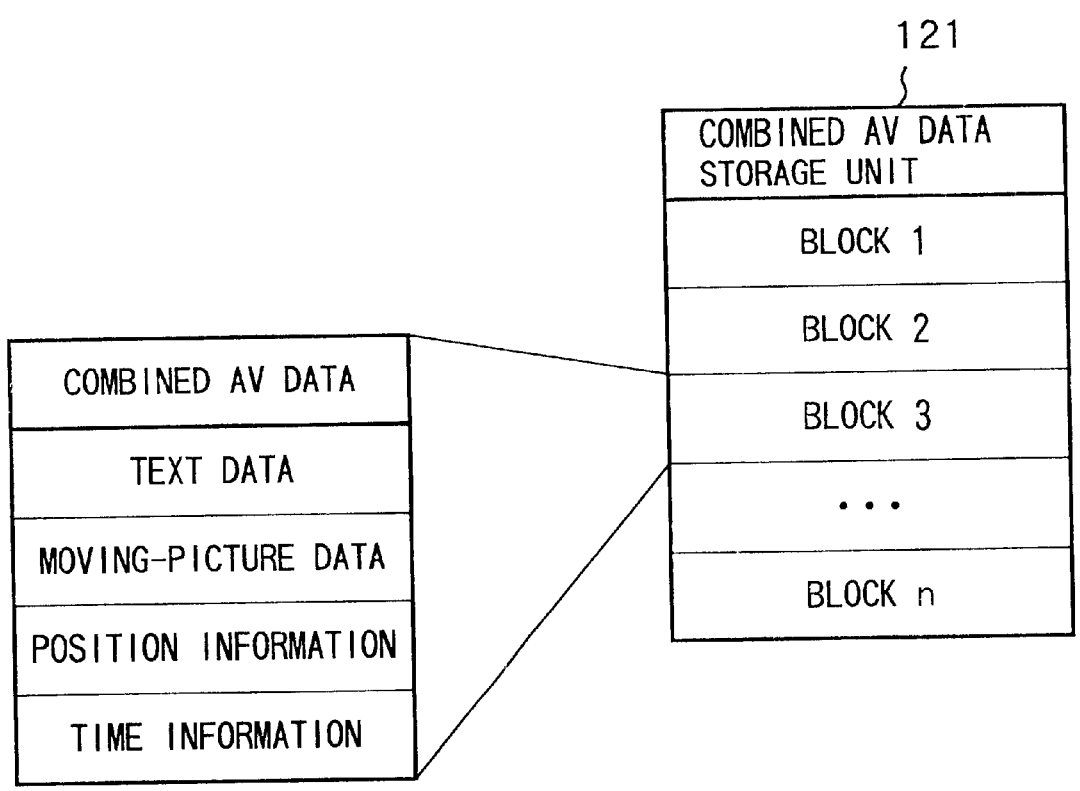
FIG. 12 is a diagram useful in describing the arrangement of documents according to the third embodiment.

Next, at step S103, the sound data of the sound blocks is subjected to speech recognition on a block-by-block basis and a conversion is made from sound data to text code. This speech recognition processing is capable of being executed by well-known techniques. Next, at step S104, one block of the text data obtained is recorded in an area of a combined AV data storage unit 121 that is for storing the text data, as shown in FIG. 12. The combined AV data storage unit 121 has been allocated in the RAM 107.

Next, at step S105, moving-picture data that corresponds to a sound block is treated as valid image data and moving-picture data that corresponds to a soundless block is treated as invalid image data. This is followed by step S106, at which one block of moving-picture (valid-image) data is recorded in an area of the combined AV data storage unit 121 that is for storing such data, as shown in FIG. 12.

It is determined at step S107 whether all of the blocks obtained by partitioning at step S102 have been subjected to the processing of steps S103–S106. If the processing of all blocks is finished, control proceeds to step S108. If all blocks have not yet been processed, then control returns to step S103.

The user selects the desired document format at step S108 in order to convert the entered sounds and moving pictures to a document format such as the HTML format, RTF or PDL format, etc. It is assumed in the third embodiment that the user has selected the HTML document format.

Next, at step S109, the text data that has been stored in the combined AV data storage unit 121 is converted to HTML document data block by block, the moving-picture data corresponding to this text data is converted to a moving-picture file [e.g., an AVI (Audio-Visual Interface) file] suitable for being linked to the HTML document, and the file is saved. If the moving-picture data corresponding to the text of an HTML document is thus linked to the text of the HTML document, then the corresponding moving picture will be displayed on the monitor at step S110 by using a mouse or the like to click on a character string or icon which indicates the link to the moving-picture data associated with the text displayed on the monitor by a browser or the like. Naturally, software that supports the reproduction of moving pictures is necessary to reproduce the moving pictures.

The HTML document created at step S109 and the still picture corresponding to this document can also be printed at step S110 using the printer or the like.

Fourth Embodiment

A fourth embodiment of the present invention will be described in regard to a case where sound data is handled by the HTML document format.

Figure 14:
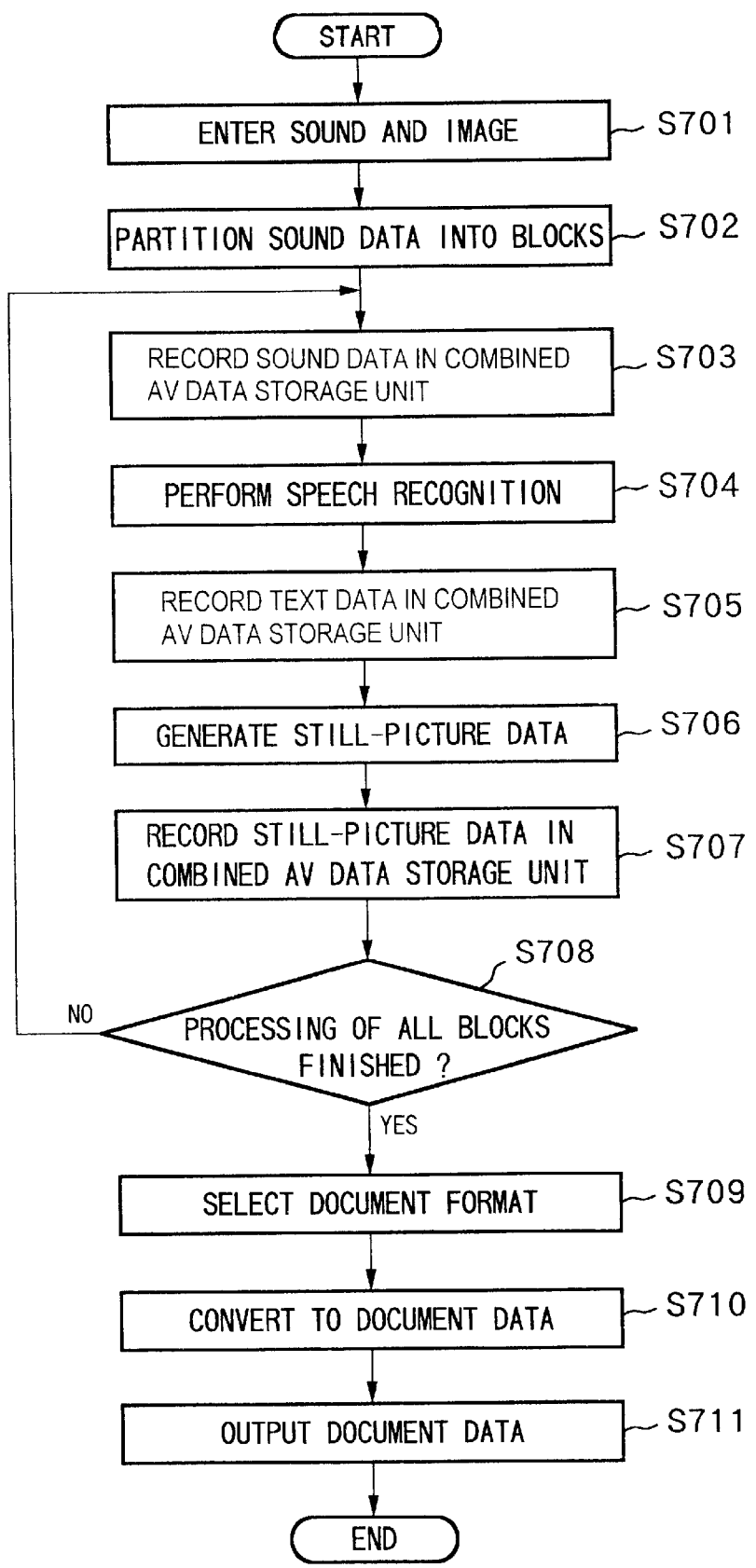
FIG. 14 is a flowchart for describing processing executed by an information processing apparatus according to a fourth embodiment of the present invention.

FIG. 14 is a flowchart for describing processing executed by an information processing apparatus according to the fourth embodiment of the present invention. It should be noted that the processing of steps S701 and S702 is the same as that of steps S101 and S102 shown in FIG. 11, and that the processing of steps S708 and S709 is the same as that of steps S107 and S108 shown in FIG. 11. Accordingly, the processing of these steps need not be described again in detail.

Figure 15:
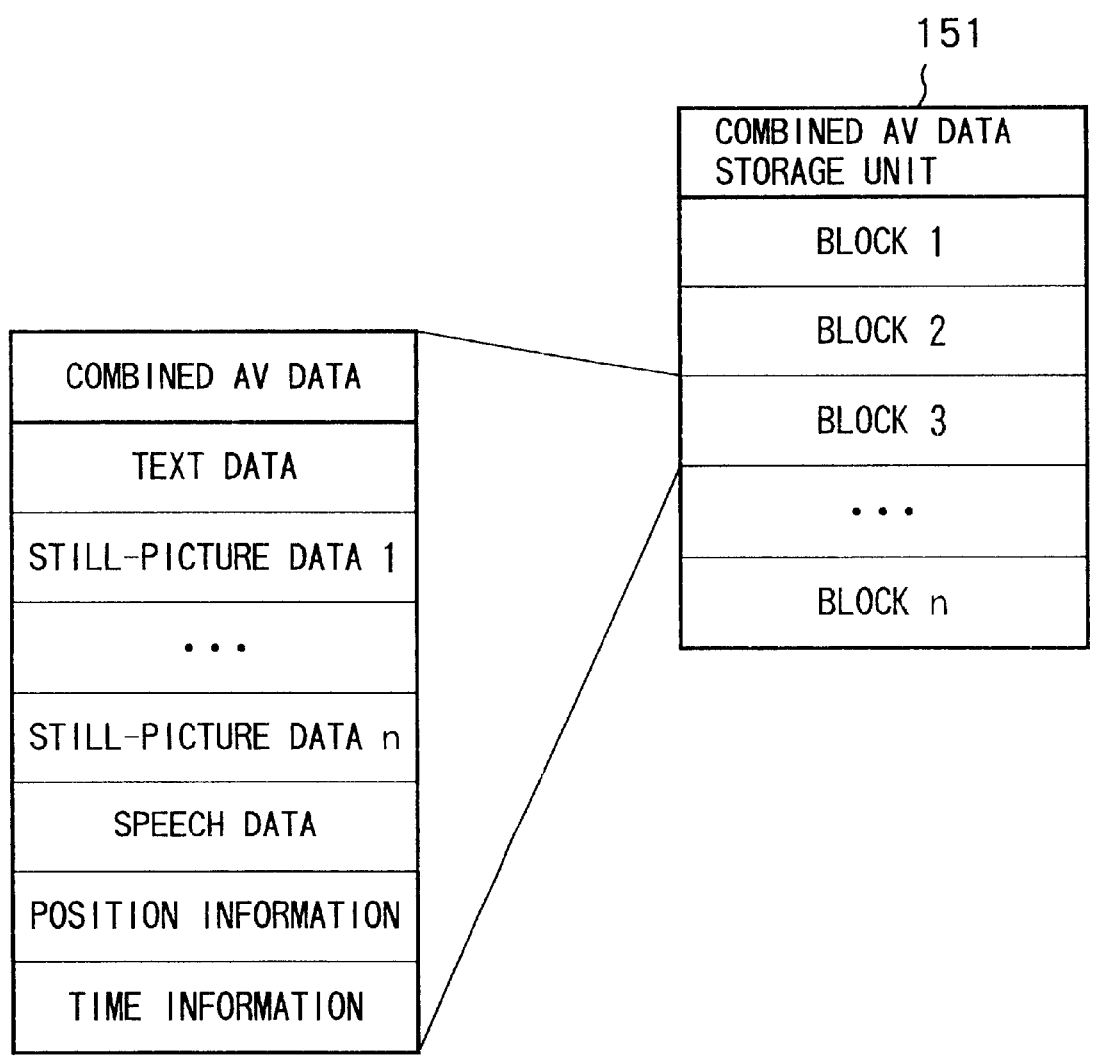
FIG. 15 is a diagram showing the structure of a combined audio-visual data storage unit according to the fourth embodiment.

At step S703, sound data is stored in an area of a combined AV data storage unit 151 that is for storing the sound data, as shown in FIG. 15. The combined AV data storage unit 151 has been allocated in the RAM 107. This is followed by step S704, at which speech recognition is applied to the sound of a sound block on a per-block basis and the sound data is converted to text code. This speech recognition processing is capable of being executed by a well-known technique.

Next, at step S705, one block of the obtained text data is recorded in an area of the combined AV data storage unit 151 that is for storing the text data, as shown in FIG. 15. Then, at step S706, moving-picture data that corresponds to one sound block is partitioned at prescribed time intervals T and n items of still-picture data are generated from the moving-picture data that corresponds to the time partitioned. The n items of still-picture data are treated as valid image data corresponding to one sound block, and moving-picture data corresponding to one soundless block is treated as invalid image data.

Next, at step S707, the valid image data, namely the n items of still-picture data corresponding to one sound block, is stored in the area of the combined AV data storage unit 151 that is for storing this valid image data, as shown in FIG. 15. The processing of steps S708 and S709 is the same as that of steps S107 and S108 shown in FIG. 11 and need not be described again. In the fourth embodiment, however, it is assumed that the HTML document format has been selected by the user.

Next, at step S710, the text data that has been stored in the combined AV data storage unit 151 is converted to HTML document data block by block, the sound data corresponding to this text data is converted to a sound file (e.g., a WAV file) suitable for being linked to the HTML document, and the file is saved. If the sound data corresponding to the text of an HTML document is thus linked to the text of the HTML document, the corresponding sound will be reproduced by a speaker or the like at step S711 by using a mouse or the like to click on a character string or icon which indicates the link to the sound data associated with the text displayed on the monitor by a browser or the like. Naturally, software that supports the reproduction of sound is necessary to reproduce the sound.

The HTML document created at step S710 and the still picture corresponding to this document can also be printed at step S711 using the printer or the like.

As many apparently widely different embodiments of the

Thus, in accordance with the embodiments described above, speech recognition processing and image recognition processing are executed based upon video captured using a video camera and sound recorded by the camera, thereby making it possible to convert the captured video and recorded sound to document form. Similarly, sound data and moving-picture data output by a television can be converted to document form. In other words, in a teleconference or the like, text data and still-picture data are generated from sound data and moving-picture data from a point A, and text data and still-picture data are generated from sound data and moving-picture data from a point B. By arranging these items of data in a time series, document (minutes) data in line with the flow of the conference is created. Accordingly, when a document (minutes) in a teleconference or the like is created automatically, it is possible to create a document (minutes) that clearly indicates where statements were made and where images were generated as well as the order in which these events occurred.

As many apparently widely different embodiments of the present invention can be made without departing from the spirit and scope thereof, it is to be understood that the invention is not limited to the specific embodiments thereof except as defined in the appended claims.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions which, according to the above embodiments, are realized by executing the program codes that are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or the entire process in accordance with designations of the program codes and realizes functions of the above embodiments

What is claimed is:

1. An information processing apparatus comprising:
   input means for inputting different pieces of information, each of which is generated in different locations;
   recognition means for recognizing speech from sound data contained in each piece of input information and generating text data from the speech recognized; and
   generating means for generating still-picture data from moving-picture data contained in each piece of input information and generating data in which text data and still picture data that are generated have been arranged based upon the locations at which the information originated and the order in which this information originated,
   wherein the still-picture data is generated when a reproductive level of the sound data is greater than a prescribed level, and that reproductive level is kept over a prescribed time.

2. The apparatus according to claim 1, wherein said generating means arranges the text data and the still-picture data in the order in which they occurred.

3. The apparatus according to claim 1, wherein said generating means arranges the text data and the still-picture data in the order in which they occurred and in a sequence made to correspond to the locations at which they occurred.

4. The apparatus according to claim 1, wherein said recognition means partitions the sound data into data blocks to undergo speech recognition and data blocks not to undergo speech recognition if the reproductive level is greater than the prescribed level, and that reproductive level is kept over the prescribed time, and performs speech recognition in units of the data blocks obtained by partitioning.

5. The apparatus according to claim 4, wherein the generated still-picture data corresponds to the data block to undergo speech recognition.

6. The apparatus according to claim 1, wherein said generating means generates document data obtained by combining the text data and the still-picture data.

7. The apparatus according to claim 6, further comprising conversion means for converting a data format of the text data to a format that corresponds to the format of the document data.

8. The apparatus according to claim 7, wherein the format of the document data is one capable of being selected from at least a Hypertext Markup Language format, a Rich Text Format and a Page Description Language format.

9. An information processing apparatus comprising:
   input means for inputting different pieces of information, each of which is generated in different locations;

recognition means for recognizing speech from sound data contained in each piece of input information and generating text data from the speech recognized;

generating means for generating still-picture data from moving-picture data contained in each piece of input information and generating document data in the Hypertext Markup Language format in which text data and still-picture data that are generated have been arranged based upon the locations at which the information originated and the order in which this information originated; and attaching means for attaching link information, which provides a link to sound and/or a moving picture contained in the input information, to the document data, wherein the still-picture data is generated when a reproductive level of the sound data is greater than a prescribed level, and that reproductive level is kept over a prescribed time.

10. The apparatus according to claim 9, wherein said generating means arranges the text data and the still-picture data in the order in which they occurred.

11. The apparatus according to claim 9, wherein said generating means arranges the text data and the still-picture data in the order in which they occurred and in a sequence made to correspond to the locations at which they occurred.

12. An information processing method comprising the steps of:

inputting different pieces of information, each of which is generated in different locations;

recognizing speech from sound data contained in the each piece of input information and generating text data from the speech recognized;

generating still-picture data from moving-picture data contained in each piece of input information when a reproductive level of the sound data is greater than a prescribed level, and that reproductive level is kept over a prescribed time; and arranging text data and still-picture data that are generated based upon the locations at which the information originated and the order in which this information originated.

13. The method according to claim 12, wherein the text data and the still-picture data are arranged in said arranging step in the order in which they occurred.

14. The method according to claim 12, wherein the text data and the still-picture data are arranged in said arranging step in the order in which they occurred and in a sequence made to correspond to the locations at which they occurred.

15. An information processing method comprising the steps of:

inputting different pieces of information, each of which is generated in different locations;

recognizing speech from sound data contained in each piece of input information and generating text data from the speech recognized;

generating still-picture data from moving-picture data contained in each piece of input information when a reproductive level of the sound data is greater than a prescribed level, and that reproductive level is kept over a prescribed time;

creating document data in the Hypertext Markup Language format in which text data and still-picture data that are generated have been arranged based upon the locations at which the information originated and the order in which this information originated; and attaching a link information, which provides a link to sound and/or a moving picture contained in the input information, to the document data.

16. The method according to claim 15, wherein the text data and the still-picture data are arranged in said creating step in the order in which they occurred.

17. The method according to claim 15, wherein the text data and the still-picture data are arranged in said creating step in the order in which they occurred and in a sequence made to correspond to the locations at which they occurred.

18. A computer program product comprising a computer readable medium having computer program code for executing information processing, said product comprising:

an input process procedure code for instructing a computer to input different pieces of information sent from respective ones of different locations;

a recognition process procedure code for instructing the computer to recognize speech from sound data contained in the input information and text data from the speech recognized;

a generation process procedure code for instructing the computer to generate still-picture data from moving-picture data contained in the pieces of input information when a reproductive level of the sound data is greater than a prescribed level, and that reproductive level is kept over a prescribed time; and an arrangement process procedure code for instructing the computer to arrange text data and still-picture data that are generated based upon the locations at which the information originated and the order in which this information originated.

19. A computer program product comprising a computer readable medium having computer program coded for executing information processing, said product comprising:

an input process procedure code for instructing a computer to input different pieces of information, each of which is generated in different locations;

a recognition process code for instructing the computer to recognize speech from sound data contained in the each piece of input information and to generate text data from the speech recognized;

a generation process procedure code for instructing the computer to generate still-picture data from moving-picture data contained in the each piece of input information when a reproductive level of the sound data is greater than a prescribed level, and that reproductive level is kept over a prescribed time;

an arrangement and generation process procedure code for instructing the computer to generate document data in the Hypertext Markup Language format in which text data and still-picture data that are generated have been arranged based upon the locations at which the information originated and the order in which this information originated; and an attachment process procedure code for instructing the computer to attach link information, which provides a link to sound and/or a moving picture contained in the input information, to the document data.

* * * * *

UNITED STATES PATENT AND TRADEMARK OFFICE
CERTIFICATE OF CORRECTION

PATENT NO. : 6,349,303 B1  
DATED : February 19, 2002  
INVENTOR(S) : Kazuyuki Saito It is certified that error appears in the above-identified patent and that said Letters Patent is hereby corrected as shown below:

Column 1,  
Line 40, "the" should be deleted.  
Line 54, "the" should be deleted.

Column 6,  
Line 6, "again" should read -- again in --.  
Line 60, "whick." should read -- which the validity flag is "1" is selected as a valid block. --.  
Line 63, "data is" should read -- data and the image data corresponding to this document data is --.

Column 9,  
Line 24, should be deleted.

Column 12,  
Line 43, "the" should be deleted.  
Line 48, "the" should be deleted.

Signed and Sealed this

Eighteenth Day of March, 2003

JAMES E. ROGAN  
*Director of the United States Patent and Trademark Office*